June 9, 1953            T. W. KENYON            2,641,134
GYROSCOPICALLY OPERATED MEASURING INSTRUMENT
Filed July 6, 1950            3 Sheets-Sheet 1
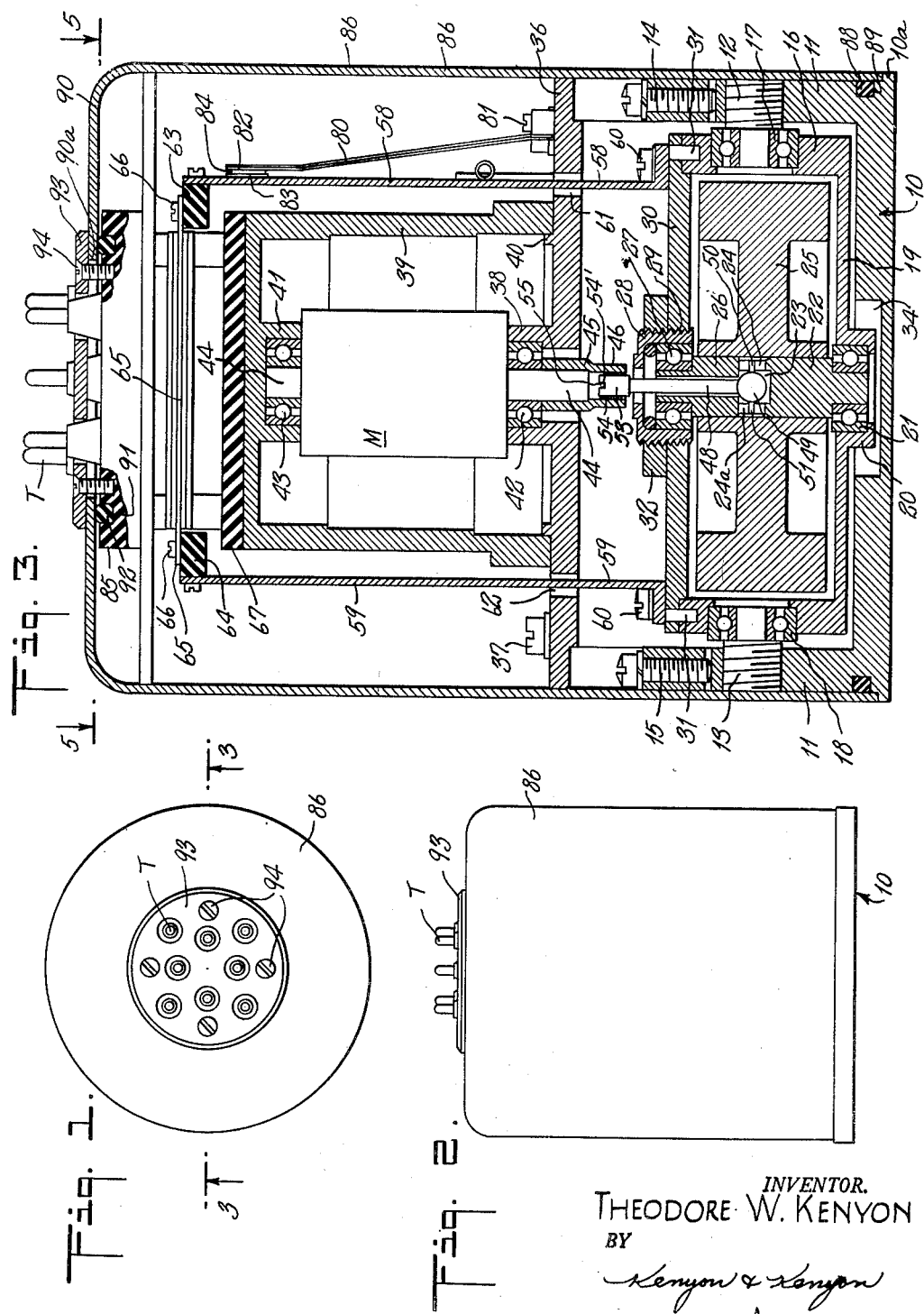
INVENTOR.
THEODORE W. KENYON
BY
Kenyon & Kenyon
ATTORNEYS

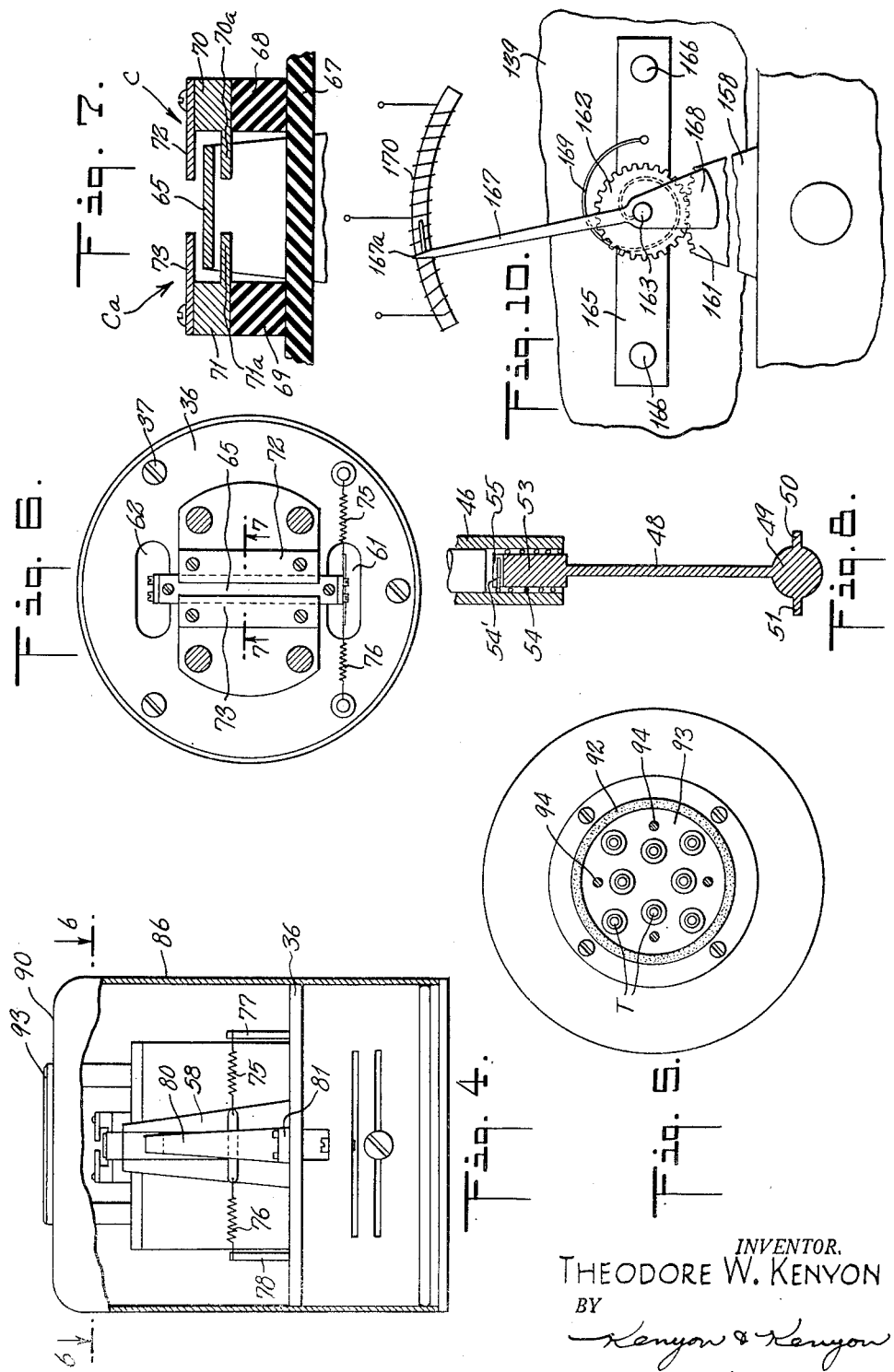

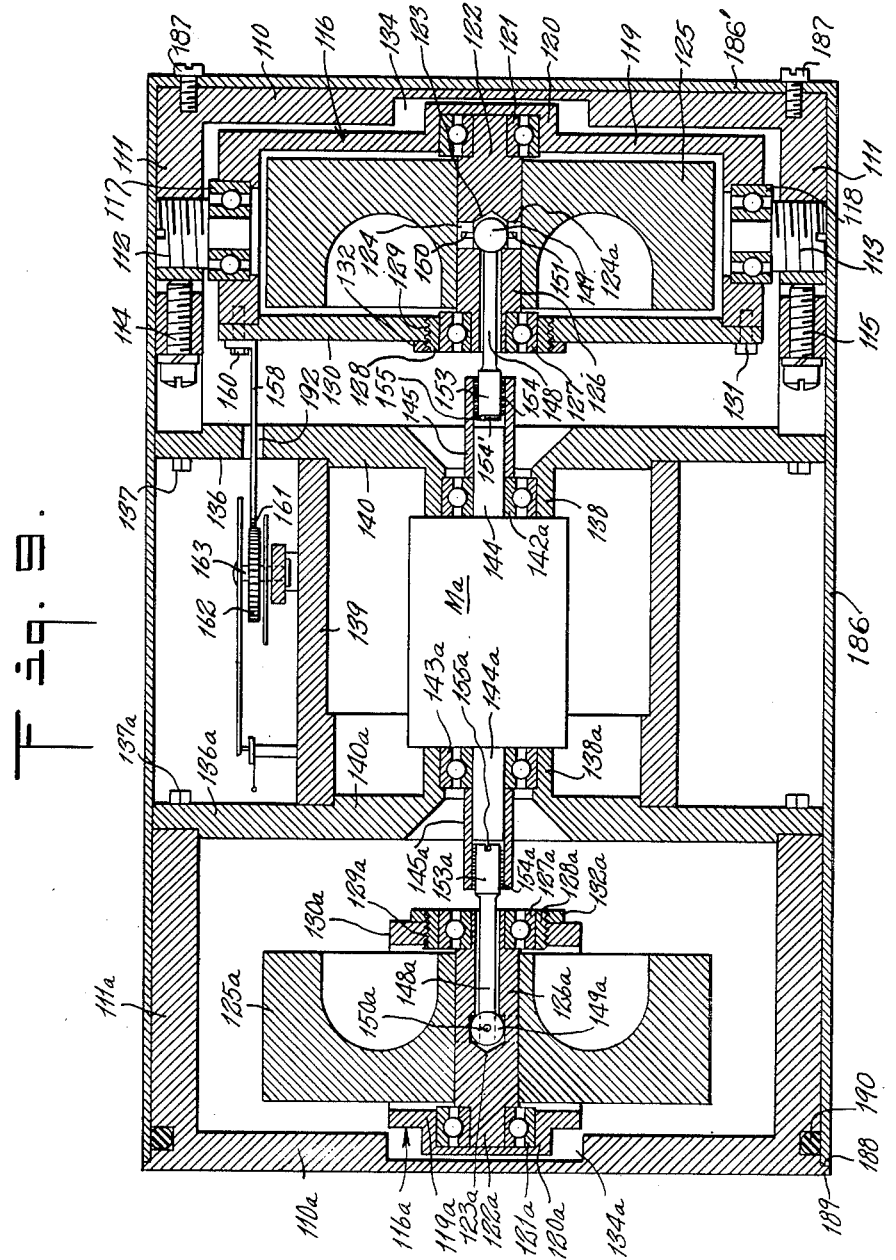

Patented June 9, 1953

UNITED STATES PATENT OFFICE

2,641,134

GYROSCOPICALLY OPERATED MEASURING INSTRUMENT

Theodore W. Kenyon, Huntington, N. Y., assignor to Gyromechanisms, Inc., a corporation of New York Application July 6, 1950, Serial No. 172,273

7 Claims. (Cl. 74—5.6)

This invention relates to gyroscopically operated measuring instruments and more particularly to rate gyros useful in aircraft, marine and land vehicles.

Objects and features of the invention are to provide instruments of this kind that have high sensitivity, wide useful range, high accuracy and extremely high natural frequency and wherein a gyro and gimbal of very favorable inertia ratio are coupled to a continuously linear signal pick-off which in one example is frictionless.

In the rate gyro constituting this invention, the driving motor is separated from the gyro wheel so that all possible non-spinning mass is eliminated from the suspended member. Gyro wheel drive from the driving motor is accomplished by use of a remote drive, and a remote drive connecting means including a ball and pin assembly at the intersection of the wheel and gimbal axes. This remote drive as a further advantage of permitting the use of a simple but effective clutch in the connecting means between the motor shaft and the gyro wheel. With this arrangement the small synchronous driving motor is not required to provide torque for immediate starting of the gyro wheel and can, therefore, come up to lock-in speed almost immediately. The gyro wheel driven through the clutch attains synchronous speed shortly thereafter (within approximately 90 seconds). A direct coupling on the other hand, would require a driving motor at least three times as powerful.

Other objects and features of the invention are the provision of structure enabling the separation of the driving motor from the gyro wheel to eliminate all possible non-spinning mass from the gyro wheel and the utilization of clutch coupling between the gyro wheel and motor driving shaft whereby a motor of approximately ⅓ the power necessary for direct drive can be utilized effectively.

Another object and feature of the invention is the provision of structure providing high sensitivity and a natural frequency that is high.

The performance of a gyro embodying the features of this invention can best be explained in terms of fundamental theory. The deflection sensitivity of a rate gyro is given by:

$$S = \frac{\theta}{\Omega} = \frac{I_p \omega_p}{k} \qquad (1)$$

where:

$S$ = deflection sensitivity
$\phi$ = deflection angle of gimbal
$\Omega$ = measured turn rate
$I_p$ = polar moment of inertia
$\omega_p$ = angular velocity about spin axis
$k$ = stiffness about deflection axis (This equation is only approximate where the deflection angles are large.)

The natural frequency of the gyro is a function of the ratio of the stiffness to the inertia about the deflection axis; thus:

$$f_n = \frac{1}{2\pi}\sqrt{\frac{k}{I_1}} \qquad (2)$$

where:

$f_n$ = undamped natural frequency
$I_1$ = inertia of gyro wheel and gimbal as measured about gimbal axis The above two equations show the incompatibility of high sensitivity and high natural frequency. An increase in stiffness $k$ aimed at increasing the natural frequency must necessarily lower the deflection sensitivity.

Since the stiffness $k$ is a dependent variable adjusted according to the design requirements, it can be eliminated in a simultaneous solution of the above two equations to obtain an expression relating frequency and sensitivity.

$$S = \frac{\theta}{\Omega} = \frac{I_p \omega_p}{I_1 (2\pi^2) f_n^2} \qquad (3)$$

The factor, $$\frac{I_p}{I_1}\omega_p$$

represents a figure of merit for the rate gyro. Obviously, it is advantageous to increase the spin velocity and to obtain through careful design a high ratio of inertia about the spin axis to that about the gimbal axis.

Note in this relationship that the turn rate $\Omega$ corresponding to a given deflection $\phi$ is proportional to the frequency squared $f_n^2$. The maximum linear range deflection used in the instant gyro is 0.75 degree.

Since the figure of merit, $$\frac{I_p}{I_1}\omega_p$$

is high for the gyro of this invention, it can be seen that the natural frequency for the design maximum rate of turn is also very high.

Other objects and novel features will become apparent from the following specification and the accompanying drawings wherein Fig. 1 is a top plan view of a rate gyro embodying the invention;

Fig. 2 is an elevational view of the rate gyro;

Fig. 3 is a transverse vertical section on an enlarged scale taken along line 3—3 of Fig. 1;

Fig. 4 is an elevational view similar to Fig. 2 with a part of the casing broken away to illustrate details of construction;

Fig. 5 is a transverse horizontal section taken along line 5—5 of Fig. 3;

Fig. 6 is a transverse horizontal section taken along line 6—6 of Fig. 4;

Fig. 7 is a vertical section taken along line 7—7 of Fig. 6;

Fig. 8 is a vertical section of a ball and pin assembly element used in the rate gyro of the invention;

Fig. 9 is a transverse longitudinal section of a modified form of rate gyro, and Fig. 10 is a partially diagrammatic elevation of a modified pick-off system that may be used with either modification in place of that shown in Figs. 3, 4, 6 and 7.

Referring to the drawing, 10 denotes a substantially cup-shaped base in which in its upstanding wall 11 at diametrically opposite points, the studs 12, 13 are threadedly mounted and conveniently locked in mounted position by the set screws 14, 15. A gimbal frame 16 is rotatively supported on the studs 12, 13 by ball bearings 17, 18. This gimbal frame has a bottom wall 19 provided with a journal 20 which receives a ball bearing support 21 which latter carries a shaft section 22. This shaft section 22 has a recess 23 at one end and vertical slots 24 and 24a at diametrically opposite points in the wall defining the recess 23. A gyro wheel 25 is frictionally mounted on the shaft section 22 for rotation about the axis of shaft section 22 on the ball bearing support 21. A second shaft section 26 axially alined with the shaft section 22 is fitted within the center bore of the gyro wheel 25. This shaft section 26 is tubular and extends upwardly of the wheel 25 into a ball bearing support 27 carried by a threaded plug 28. The plug 28 is threadedly engaged in a threaded hole 29 of a transversely extending top plate 30 spanning the gimbal frame 16. The plate 30 is secured as by bolts or pins 31 to the side wall of the frame 16. A locking nut 32 serves to lock the plug 28 in any adjusted position to prevent axial displacement of wheel 25.

A well 34 is provided in the bottom of frame 10 of substantially larger dimensions than those of the journal 20 so as to permit free pivoting of the gimbal frame 16 on the stub shafts 12 and 13.

A cover plate 36 is secured as by bolts 37 on the top edge of the frame 10. A centralized journal 38 extends upwardly from the plate 36. An inverted cup-shaped shell or cap 39 is secured to the upper face of plate 36 being centralized relative to the journal 38 by an upstanding annular flange 40 protruding from the upper face of plate 36. The shell or cap 39 has an inwardly extending boss 41 axially alined with journal 38. The two bosses 38 and 41 together with ball bearings 42, 43 rotatively support the rotor shaft 44 of an electric motor M. In this embodiment the motor is preferably an A. C. three phase motor whose field coils (not shown in detail) are supported within shell 39 in appropriate relationship to the rotor. The rotor shaft 44 extends downwardly through the boss 38 and has a sleeve 45 secured thereto. Shaft 44 and its sleeve 45 are axially alined with the shaft sections 22 and 26 but spaced from the latter as shown. The sleeve 45 has a reduced diametered end portion 46.

A special remote drive connection is utilized to couple rotor shaft 44 and its sleeve 45 to the shaft section 22. This arrangement includes a ball and pin assembly and simple clutch providing thereby a remote drive for the gyro wheel 25 which has among its advantages the elimination of all possible non-spinning mass from the gyro wheel parts and also permits use of a driving motor substantially three times less powerful than what would be required if direct coupling were employed.

The ball and pin assembly comprises a pin member 48 of substantially smaller diameter than the bore of the shaft section 26 which extends therethrough and terminates in a ball 49 which is received in the recess 23 of the shaft member 22. The ball is dimensioned so that its center lies substantially at the intersection of the axes of the stub shafts 12 and 13 and the vertical axes of shaft sections 22 and 23. Lateral pins 50 and 51 alined with the axes of stub shafts 12 and 13 when ball 49 is in recess 23 engage the respective vertical slots 24 and 24a to provide a universal joint coupling between member 48 and shaft section 22 substantially at the intersection of the gimbal frame and gyro wheel axes.

A head 53 is provided at the outer end of pin 48. This head is of slightly smaller external diameter than the inner diameter of portion 46 of sleeve 45 and extends into said portion. A coil spring 54 in frictional engagement with the inner surface of portion 46, also surrounds the head 53 within said portion 46 and has one end 54' positively engaged in a slot 55 in the top of head 53. This spring 54 and its relative arrangement with respect to head 53 and sleeve portion 46, provides a simple, effective clutch between the rotor shaft 44 and the gyro wheel 25. With this arrangement, the small synchronous motor is not required to provide torque for immediate starting of the gyro wheel 25 but instead can come up to lock in speed immediately because of relative slip resulting from tightening of the spring when starting torque is applied to the rotor shaft 44. This slip continues at a diminishing rate until the gyro rotor 25 driven through the clutch coupling at spring 54 attains synchronous speed with the rotor shaft 44 shortly thereafter, usually within 90 seconds. At synchronous speed the spring 54 is fully expanded and in full frictional engagement with the inner surface of portion 46 of sleeve 45 providing effective synchronous speed drive of gyro wheel 25 through said spring and the ball and pin coupling with shaft portion 22.

A pair of oppositely-located, upstanding vanes 58, 59 are secured to the top face of cover plate 30 as by bolts 60. These vanes extend upwardly through respective slots 61, 62, tapering toward their upper ends which terminate above the level of the top face of the shell 39. Insulating blocks 63, 64 are secured to the respective vanes 58, 59 at their upper ends and a metallic cross piece 65 extends transversely and substantially horizontally between the blocks 63, 64 being secured to each as by bolts 66.

An insulating disc 67 is secured to the top face of shell 39. A pair of spaced apart support blocks 68, 69 of insulating material are secured to the top face of disc 67. These blocks 68, 69 extend in parallelism with the cross bar or piece 65. A pair of metallic bars 70, 71 are secured to the respective blocks 68, 69. These bars have the respective lateral flanges 70a, 71a which are positioned to underlie the cross bar 65 being spaced apart throughout their lengths. Plates 72, 73 are secured to the bars 70, 71 and are dimensioned to overlie the respective flanges 70a, 71a above the cross piece 65 being spaced apart from the latter. The respective plates 72, 73 and flanges 70a, 71a define fixed plates of two variable electrical condensers C and Ca. The cross piece 65 constitutes a movable condenser plate which is movable substantially laterally in the spaces defined between the fixed plates to provide said variable condensers C and Ca whose capacities are varied by movement of the cross piece 65 relative to the respective pairs of fixed plates defined respectively by flange 70a and plate 72 and flange 71a and plate 73. The fixed plates and the movable plate of these two condensers C and Ca are connected in electrical circuits as the controls for rate indicators from which readings may be taken. These electrical circuits which do not form part of the present invention are not shown herein.

One of the two vanes, in this embodiment the vane 58, is provided with spring restraints. As shown a pair of springs 75, 76 are secured adjacent opposite side edges to the vane 58 and to respective fixed posts or members 77, 78 secured to the plate 36. These springs 75, 76 act oppositely on the vane 58 tending to centralize it and in addition provide the stiffness factor $k$ about the deflection axis referred to in the formulae hereinbefore set forth. These springs which are adjustable or replaceable as required act, in the embodiment shown, to provide any full scale rate measurement up to 60,000 degrees per minute (17.5 radians per second) and can measure down to 0.5 degree per minute in the lower ranges. Typical values are given below maximum values at 0.75 degree deflection.

| Maximum rate measurement | Minimum rate measurement | Ratio of maximum to minimum | Natural Frequency |
|---|---|---|---|
| Deg./min. | Deg./min. | | C. P. S. |
| 1,000 | 0.5 | 2,000 | 20 |
| 1,500 | 0.5 | 3,000 | 25 |
| 3,000 | 1.0 | 3,000 | 35 |
| 10,500 | 3.5 | 3,000 | 66 |
| 24,000 | 8.0 | 3,000 | 100 |
| 54,000 | 18.0 | 3,000 | 150 |
| 96,000 | 32.0 | 3,000 | 200 |

A bimetallic spring finger 80 is secured at 81 to the plate 36 and has a surface 82 in proximate engagement with a surface 83 on the bane 58. A viscous fluid 84 such as oil or other suitable viscous material having a viscosity number of the order of approximately 200,000 centistokes is interposed in the small gap between the two surfaces. At least one such viscous material is one selected from organo-silicon oxide polymers made by combining silicon dioxide with methyl or ethyl groups of molecules derived from alcohols or with ethylene chloride or phenol. Both straight chain or ring type, organic molecules may be used with silicon dioxide resulting in products of various properties. Such materials all are characterized by their temperature stability, inertness, waterproofness and excellent dielectric properties. The selected of these materials particularly suitable has a viscosity number of the order of 200,000 centistokes and is a product of Dow Corning Corporation of Midland, Michigan and is characterized by it as Silicone D. H. 200. It is to be understood that other viscous materials having similar properties can be employed. The bimetallic strips of finger 80 are so designed that the gap between its surface 82 and surface 83 is varied inversely with temperature thus compensating for the change in viscosity of the damping fluid. By this means the damping is kept constant over a wide temperature range. The bimetallic finger 80 with the surfaces 82 and 83 and the viscous material 84 is commonly known as a constant viscous damping arrangement.

The leads (not shown) for supplying electric current to the motor are connected to terminals T extending from a terminal block 85 supported from the insulating plate or disc 67. This block 85 also carries other terminals connected in the electric circuits of the condensers C and Ca. An enclosing casing 86 encases the entire mechanism described. In the embodiment shown this casing has substantially cylindrical shape fitting around the periphery of the base 10 with its lower edge engaging an annular bead or flange 10a of the base 10. A sealing ring 88 of compressible material such as rubber is positioned within an annular groove 89 in base 10 and acts to seal the lower end of casing 86 and its contents. The top 90 of the casing has an opening 90a through which the terminals project. The block 85 has a groove 91 containing a sealing ring 92 of material similar to that of ring 88. This ring 92 is compressed by a clamping ring 93 and screws 94 to seal the casing contents from atmosphere about the opening 90. The air content of casing 86 may be evacuated or replaced by inert gas so that the mechanism contents of casing 86 will operate either in vacuo or in an inert gas and will not be subject to action of moisture or to variations in atmospheric environment.

Access for repair or replacement of posts is provided by the removability of the casing 86 on the removal of the screws 94. Electric circuit connections are made available through the terminal prongs protruding from opening 90a.

Modification

Where it is desirable to have a rate gyro responsive along more than a single parameter, for example two parameters at right angles to each other, the necessary structure can all be provided within a single enclosure and using a single motor. Such a construction is illustrated in Fig. 9 hereof.

In Fig. 9, 110 denotes a substantially cup-shaped base which in its side wall 111 at diametrically opposite points, the studs 112, 113 are threadedly mounted and conveniently locked in mounted position by the set screws 114, 115. A gimbal frame 116 is rotatively supported on the studs 112, 113 by ball bearings 117, 118. This frame 116 has a wall 119 provided with a journal 120 which receives a ball bearing support 121 which latter carries a shaft section 122. This shaft section 122 has a recess 123 at one end and longitudinal slots 124 and 124a at diametrically opposite points in the wall defining the recess 123. A gyro wheel 125 is frictionally mounted on the shaft section 122 for rotation about the axis of shaft section 122 on the ball bearing support 121. A second shaft section 126 alined with the shaft section 122 is fitted within the center bore of the gyro wheel 125. This section 126 is tubular and extends outwardly of the wheel 125 into a ball bearing support 127 carried by a threaded plug 128. The plug 128 is threadedly engaged in a threaded hole 129 of a transversely extending plate 130 spanning the gimbal frame 116. The plate 130 is secured as by bolts or pins 131, 160 to the side wall of gimbal frame 116. A locking nut 132 serves to lock the plug 128 in adjusted position to prevent axial shift of wheel 125. A well 134 is provided in the wall of frame 110 of substantially larger dimensions than those of the journal 120 so as to permit free pivoting of the gimbal frame 116 on the stub shafts 112, 113. A plate 136 is secured as by bolts 137 to the edge of the side walls of frame 110. A centralized journal 138 extends outwardly of the plate 136.

A second substantially cup-shaped base 110a is axially alined with the base 110. In its side wall 111a this base carries studs (not shown) similar to the studs 112, 113 and similarly mounted on ball bearings similar to the ball bearings 117, 118 which rotatively support a gimbal frame 116a for rotation on an axis at right angles to the axis of studs 112, 113. The gimbal frame 116a has a wall 119a provided with a journal 120a which receives a ball bearing support 121a which latter carries a shaft section 122a. This shaft section 122a has a recess 123a at one end and longitudinal slots (not shown) diametrically opposite points in the wall defining recess 123a similar to slots 124, 124a. A gyro wheel 125a is frictionally mounted on the shaft section 122a for rotation about the axis of shaft section 122a on the ball bearing support 121a. A second shaft section 126a alined with the shaft section 122a is fitted within the center bore of the gyro wheel 125a. This section 126a is tubular and extends outwardly of the wheel 125a into a ball bearing support 127a carried by a threaded plug 128a. The plug 128a is threadedly engaged in a threaded hole 129a of a transversely extending plate 130a spanning the gimbal frame 116a. The plate 130a is secured as by bolts or pins (not shown) similar to the pins 131 to the side walls of the gimbal frame 116a. A locking nut 132a serves to lock the plug 128a in adjusted position to prevent axial shift of the gyro wheel 125a. A well 134a is provided in the wall of frame 110a of substantially larger dimensions than those of the journal 120a so as to permit free pivoting of the gimbal frame 116a on its stub shafts (not shown, but similar to stub shafts 112, 113) on an axis at right angles to that of the gimbal frame 116. A plate 136a is secured as by bolts 137a to the edge of the side walls of frame 110a. This plate 136a is spaced from the similar plate 136. The centralized journals 138, 138a extend toward each other from the faces of plates 136, 136a. A shell 139 is secured to the two plates 136, 136a being centralized and axially alined with the shaft sections 122, 126, 122a, 126a by the facing protruding bosses 140, 140a on the respective plates 136, 136a. Ball bearings 142a, 143a are mounted in the respective journals 138, 138a and rotatively support oppositely extending ends of 144 and 144a a rotor shaft of an electric motor Ma. In this embodiment the motor Ma is preferably an A. C. three phase motor whose field coils (not shown in detail) are supported within the shell 139 in appropriate relationship to the rotor. The rotor shaft ends 144, 144a extend respectively outwardly through the journals 138, 138a and have respective sleeves 145, 145a secured thereto. Rotor shaft ends 144, 144a and sleeves 145, 145a are axially alined with the shaft sections 122, 126 and 122a, 126a but spaced from the latter as shown.

Special coupling arrangements between the rotor shaft ends 144, 144a and respective shaft sections 122, 122a are utilized. These coupling arrangements are substantially identical with the coupling arrangement described in the first modification. Each includes a ball and pin assembly and a simple clutch providing thereby a remote drive for the two gyro wheels 125 and 125a from the common motor Ma which has among its advantages the elimination of all possible non-spinning mass from the gyro wheels and associated parts and also permits the use of a common driving motor.

The ball and pin assemblies are identical and hence only that associated with rotor shaft end 144 is described. The similar parts associated with rotor shaft end 144a are shown in the drawing at the left of Fig. 9 and bear the same reference characters with the added subscript a.

The ball and pin assembly associated with rotor shaft end 144 comprises a pin member 148 of substantially smaller diameter than the bore of the shaft section 126 which extends therethrough and terminates in a ball 149 which is received in the recess 123 of the shaft member 122. The ball 149 is dimensioned so that its center lies substantially at the intersection of the axes of stub shafts 112 and 113 and the axes of shaft sections 122, 123. Lateral pins 150, 151 alined with the axes of stub shafts 112, 113 engage the respective slots 124, 124a to provide a universal joint coupling between pin member 148 and shaft section 122 substantially at the intersection of the gimbal frame axis of rotation and that of the gyro wheel axis.

A head 153 is provided at the other end of the pin 148. This head is of slightly smaller external diameter than the inner diameter of sleeve 145 and extends into the latter. A coil spring 154 in frictional engagement with the inner surface of sleeve 145 also surrounds the head 153 and has one end 154' positively engaged in a slot 155 in the top of head 153. This spring and its relative arrangement with respect to the head 153 and sleeve 145 provides a simple, effective clutch between the rotor shaft end 144 and the gyro wheel 125 providing all the advantages noted of the similar clutch coupling described as to the first modification and operating in the same way as there described.

The take off mechanisms for communicating positional change of the vehicle as induced by the relative positions of the gimbal frames of the two gyro wheels 125 and 126 may be similar to the capacity take off systems described for the first modification. In the alternative, and as shown in Figs. 9 and 10 modified forms of take-off mechanisms may be employed.

The modified take-off mechanism is shown in Fig. 9 with respect to the gimbal frame 116 only. An identical type of such take-off mechanism (not shown in detail) is used for the gimbal frame 116a. As seen in Figs. 9 and 10 the take-off mechanism includes a vane 158 secured to the face of plate 130 as by bolts 160. This vane 158 at its outer edge is provided with a segmental gear 161. This gear meshes with a spur gear 162 fixed to a rotatable stub shaft 163 carried in a bracket 165 attached to the shell as by rivets 166. A pointer vane 167 having a counterweight 168 is fixed to shaft 163 and a biasing hair spring 169 which is adjustable to provide the desired stiffness factor $k$ and secured to the bracket 165 and to the pointer vane 167 acts to bias the latter so that its outer end 167a lies in a definite or normal position relative to an electrical resistance coil 170 shaped as a segmental arc lying in the arcuate path of travel of end 167 and over which said vane may move to alter the electric current conditions in electric circuits (not shown) connected to said coil 170 to provide readings corresponding to relative positional changes of the gimbal frame 116. The vane 158 extends through a slot 192 in the partition 136. A damping arrangement (not shown) similar to that of the damping arrangement 82, 84 of the first modification may be used with vane 158. Likewise, the capacity take-off arrangement of the first modification, may if desired be substituted for that shown in Figs. 9 and 10.

The frames 110 and 110a are joined by an enclosing cup-like shell 186, closed at one end 186' and secured by its closed end as by screws 187 to the frame 110. The rim edges 188 of shell 186 engage an annular flange 189 on frame 110a.

A sealing ring 190 similar in function to ring 88 of the first modification acts to seal off the contents of shell 186. The space in said shell may be evacuated or filled with inert gas to protect the parts therein from changes in atmospheric environment.

While specific embodiments of the invention have been described, variations in structural detail within the scope of the claims are possible and are contemplated. There is no intention, therefore, of limitation to the exact details shown and described.

What is claimed is:

1. A rate gyro comprising a frame, a gimbal frame supported rotatively on a gimbal axis from said first-named frame, a gyro wheel rotatively supported for rotation in the gimbal frame about an axis perpendicular to the gimbal axis, a driving motor separated from the gyro wheel to eliminate all possible non-spinning mass from the gimbal frame and the gyro wheel, remote drive connecting means between the motor and the gyro wheel, vane means mounted for movement with the gimbal frame, electrical take off means responsive to movement of the vane means, an overall shell mounted on first named frame and enclosing the rate gyro, and sealing off means for protecting all contents of the shell against changes in external atmospheric environment.

2. A gyroscopically operated measuring instrument comprising a gimbal suspended gyro wheel, a driving motor separated from the said wheel to eliminate all possible non-spinning mass from the gimbal suspended gyro wheel, remote drive connecting means between the motor and the gyro wheel, a vane connected for movement in response to gimbal movement and constant viscous damping means arranged to act on said vane, said last named means including a bimetallic spring member supported from a fixed part of said instrument, and having a surface in proximity to a surface of the vane and viscous fluid interposed between the said surfaces.

3. A gyroscopically operated measuring instrument comprising a gimbal frame, supporting means for carrying said frame rotatively about a gimbal axis, a gyro wheel, shaft means for rotatively supporting said gyro wheel, said shaft means comprising a tubular shaft member and a shaft member having a recess and slots adjacent the recess, a pin member extending through the tubular shaft member, a ball at one end of said pin member lying in said recess, and lateral pins extending from the ball into the slots, said ball and lateral pins providing a universal joint coupling between said pin member and the shaft member having the recess, a head on said pin member, a coil spring surrounding said head and having one of its ends positively engaged with said head, a driving motor separated from the gyro wheel and the gimbal frame, a drive shaft for said motor, a sleeve secured to said drive shaft and extending about said head and in frictional contact with said coil spring, the frictional contact between said coil spring and said sleeve being variable because one end only of said coil spring is positively engaged and decreasing as said coil spring is wound by relative rotation of the sleeve and the head, thereby providing a torque limiting action between the sleeve and the head.

4. A gyroscopically operated measuring instrument comprising a gimbal frame, supporting means for carrying said frame rotatively about a gimbal axis, a gyro wheel, shaft means for rotatively supporting said gyro wheel from the gimbal frame, said shaft means including a tubular shaft member and a shaft member having a recess, a pin member extending through the tubular shaft member, a ball at one end of said pin member lying in said recess, means extending from the ball for coupling the latter to the shaft member having the recess, said ball and said last named recess providing a universal joint coupling between said pin member and the shaft member having the recess, a head on said pin member, a coil spring surrounding said head and having one only of its ends positively engaged with said head, a driving motor separated from the gyro wheel and the gimbal frame, a drive shaft for said motor, a sleeve secured to said drive shaft and extending about said head and in frictional contact with said coil spring, the frictional contact between said coil spring and said sleeve being variable because one end only of said coil spring is positively engaged and decreasing as said coil spring is wound by frictional action upon relative rotation of the sleeve and the head, thereby providing a torque limiting action between the sleeve and the head.

5. In a gyroscopically operated measuring instrument, a gimbal frame mounted for rotative movement about a gimbal axis, a gyro wheel, shaft means for rotatively supporting said gyro wheel on a gyro wheel axis that is perpendicular to the gimbal axis, said shaft means including a part having a recess, said part including oppositely located slots adjacent the recess, a pin member extending coaxially with said shaft means, a head at one end of said pin member, a ball at the other end of said pin member, said ball lying in said recess, lateral pins extending from said ball and engaging said slots, said ball in said recess with its said lateral pins engaging in said slots providing a universal joint coupling between said shaft means and said pin member substantially at the intersection of the gimbal axis and the gyro wheel axis, a driving motor separated from the gyro wheel and the gimbal frame to eliminate all possible non-spinning mass from the gimbal frame and the gyro wheel, a drive shaft for said motor, a sleeve secured to said drive shaft, said head on said pin member extending into said sleeve, and a coil spring surrounding said head and in frictional contact with the sleeve and the head, said spring having one end positively engaged with said head, the frictional contact between said coil spring and the sleeve decreasing as the coil spring is wound by frictional action upon relative rotation of the sleeve and the head thereby providing a torque limiting action controlled by the coil spring.

6. A gyroscopically operated measuring instrument comprising a gimbal frame, supporting means for carrying said frame rotatively about a gimbal axis, a gyro wheel mounted for rotation in the frame about a gyro wheel axis that is perpendicular to said gimbal axis, means including a shaft member for so mounting said gyro wheel, said shaft member having a recess and slots adjacent the recess, a driving motor separated from the gyro wheel to eliminate all possible non-spinning mass from the gimbal frame and gyro wheel, a shaft for said driving motor, a sleeve secured to said shaft, a pin member having a head at one end and a ball at its other end, a torque limiting spring coupling said head to said sleeve, said ball lying in said recess, lateral pins extending from said ball and engaging in the slots of said shaft member, said recess and the slots adjacent thereto being located so that said ball and its lateral pins provide a universal joint whose pivoting center lies substantially at the intersection of the gimbal axis and the gyro wheel axis.

7. A gyroscopically operated measuring instrument comprising a gimbal frame, supporting means for carrying said frame rotatively about a gimbal axis, a gyro wheel mounted for rotation in the frame about a gyro wheel axis that is perpendicular to said gimbal axis, means including a shaft member having a recess for so mounting said gyro wheel, a driving motor separated from the gyro wheel and the gimbal frame to eliminate all possible non-spinning mass from the gimbal frame and gyro wheel, a shaft for said driving motor, a pin member having a head at one end and a ball at its other end, a torque limiting spring clutch coupling said head to said driving motor shaft, said ball lying in the recess of said shaft member, and means extending from said ball for positively coupling it to said shaft member, said ball and said last named means providing a universal joint whose pivoting center lies substantially at the intersection of the gimbal axis and the gyro wheel axis.

THEODORE W. KENYON.

References Cited in the file of this patent

UNITED STATES PATENTS

| Number | Name | Date |
|---|---|---|
| 794,654 | Anschutz-Kaempfe | July 11, 1905 |
| 1,773,412 | Thompson | Aug. 19, 1930 |
| 2,124,817 | Fieux | July 26, 1938 |
| 2,464,516 | Kenyon | Mar. 15, 1949 |